United States Patent Office 3,534,433
Patented Oct. 20, 1970

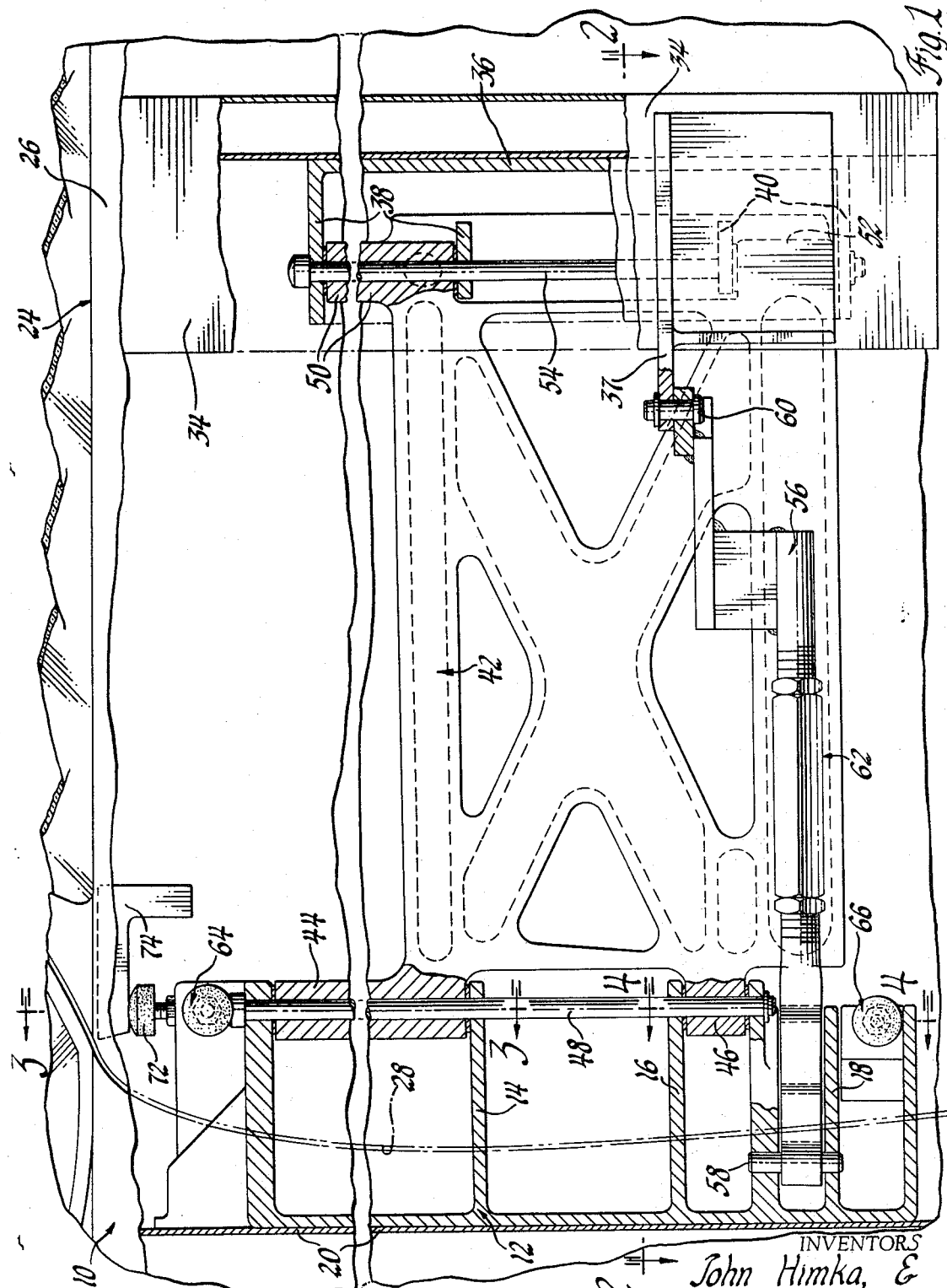

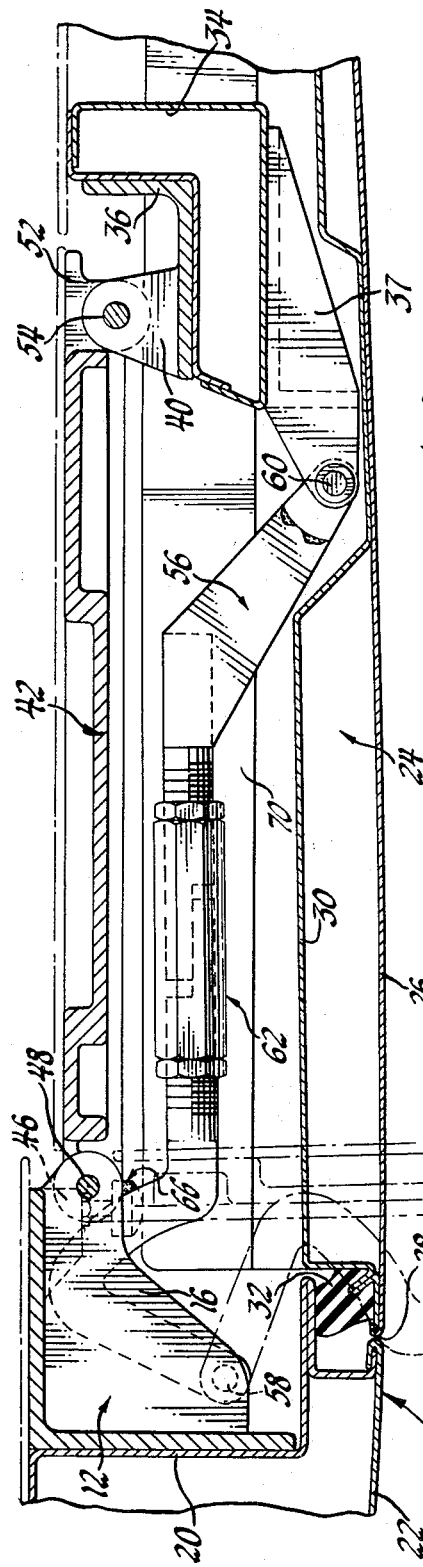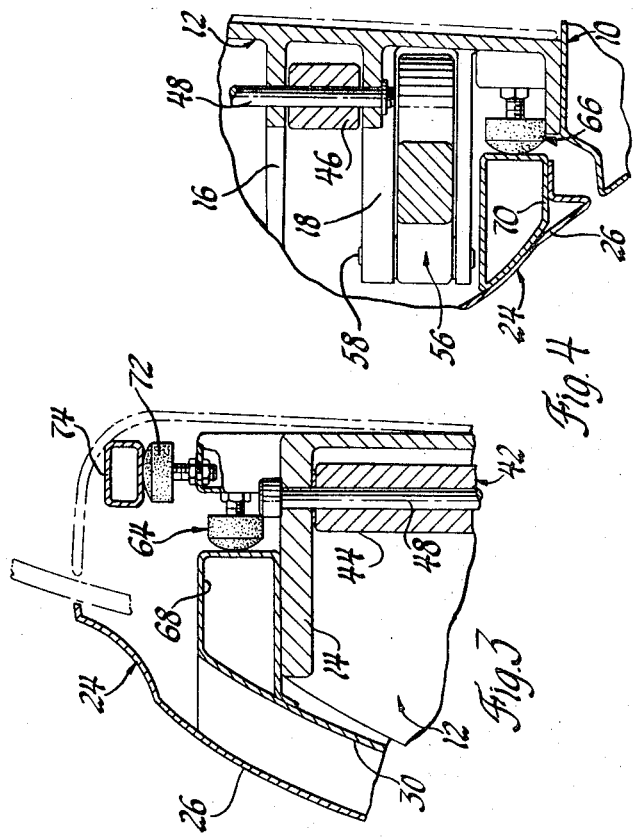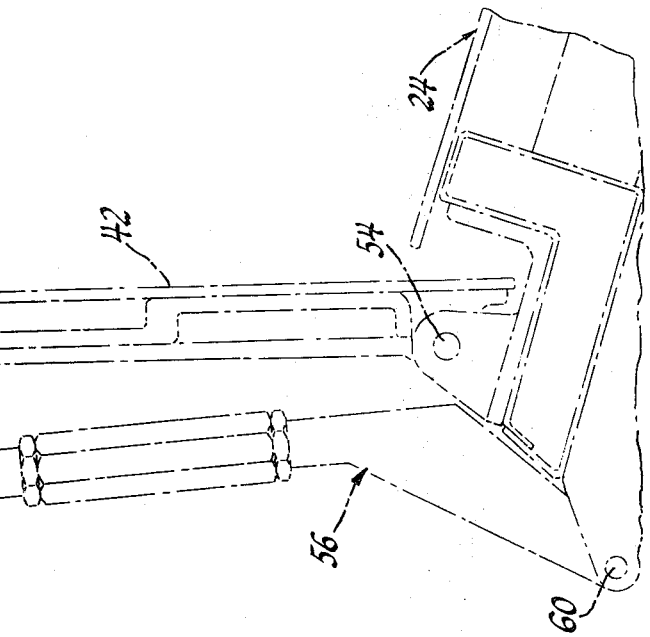

3,534,433
ANTIRATTLE CLOSURE HINGE
ARRANGEMENT
John Himka, Farmington, and Edwin R. Howell, Royal Oak, Mich., assignors to General Motors Corporation, Detroit, Mich., a corporation of Delaware
Filed Sept. 15, 1966, Ser. No. 579,546
Int. Cl. E05d 3/06, 13/00
U.S. Cl. 16—164                                    5 Claims This invention relates to vehicle bodies and more particularly to an antirattle vehicle body closure and closure hinging arrangement.

One feature of this invention is that it provides in combination with a vehicle body closure hinged for swinging movement about one edge thereof between fully opened and fully closed positions, an antirattle snubber or check means arranged to check or stop closing movement of the closure when reaching a position slightly open from fully closed position such that, in order to become fully closed, the closure must be elastically structurally stressed and deformed about the snubber means thereby to place stress on the closure hinges and the latch means at the opposite edge of the closure in a manner to eliminate rattling between the closure and the vehicle body. A further feature of the invention is in the incorporation of an antirattle snubbing or check arrangement according to the foregoing within a quadrilateral linkage type closure hinge. Yet a further feature of the invention is that in such a quadrilateral linkage type hinge, the snubber means are made adjustable as is also at least one leg of the quadrilateral linkage whereby the snubber means may be set to check the closure in the desired partially open position, yet have the hinged edge portion of the closure assume the proper flush or other relationship with the body when in such partially open position and the stressed fully closed position.

These and other features and advantages of the invention will be readily apparent from the following specification and the drawings wherein:

FIG. 1 is a partially broken away fragmentary elevational view partly in section of an automotive vehicle body including an antirattle closure and closure hinging arrangement according to the invention;

FIG. 2 is a sectional view taken generally along the plane indicated by line 2—2 of FIG. 1, and showing the door in fully closed and fully opened positions in solid and broken lines respectively;

FIG. 3 is a sectional view taken generally along the plane indicated by line 3—3 of FIG. 1; and FIG. 4 is a sectional view taken generally along the plane indicated by line 4—4 of FIG. 1.

Referring now particularly to FIG. 1 of the drawings, there is shown in elevation a vehicle body 10 in the area of a forward passenger door opening, specifically the forward portion of such opening. At the forward jamb edge of the door opening, the body is provided with a hinge pillar structure 12 including an upper bifurcated hinge portion 14, an intermediate bifurcated hinge portion 16, and a lower bifurcated hinge portion 18. As shown best in FIG. 2, the hinge pillar 12 is located within a cavity partially defined by a flanged body inner panel 20 which has an outward extension thereof hemflanged to the body fender or outer panel 22.

A vehicle body door, designated generally as 24, is provided to close the door opening and in the portion thereof shown in the drawings, includes an outer panel 26 hem-flanged at its forward marginal edge 28 with an inner panel 30, with a compressible seal strip 32 being provided at marginal edge 28 to engage the flange of inner panel 20 when the door is in closed position.

Rearward of marginal edge 28 the door inner and outer panels 26 and 30 merge and are structurally integrated in a manner not shown at the upper and lower edges of the door with a vertically extending box section 34, best seen in FIG. 2. Box section 34 has mounted to the interiorly facing portions thereof a generally L-shaped hinge box 36 including spaced pairs 38 and 40 of inwardly projecting mounting legs. On its opposite face the hinge box mounts a hinge strap 37. The remainder or rearward portion of the door 24 is not shown as it is of generally conventional character, it being understood, however, that the rearward jamb edge of the door and the adjacent jamb structure of the body are provided with the usual cooperable latch and latch striker which engage in the fully closed position of door 24 to hold the same therein.

A door hinge panel 42 interiorly closes the recess of door 24 between hinge box 36 and pillar 12 and, as seen in FIG. 1, includes at its forward edge a pair of hinge bosses 44 and 46 received respectively between bifurcated hinge portions 14 and 16 of the hinge pillar and retained therein by a common pintle 48. At the rearward edge of panel 42, similar bosses 50 and 52 thereof are received respectively between leg pairs 38 and 40 and retained therebetween by a common pintle 54. Extending between hinge strap 37 of the door and hinge pillar 12 is a hinge arm 56 pivotally mounted to the hinge pillar by a pintle 58 and to the strap 37 by a similar pintle 60. As best viewed in FIG. 2, the hinge arm 56 includes a pair of threaded portions joined by a turnbuckle assembly 62 operable to adjust in well-known manner the length of the hinge arm by threading rotation in either direction. As is apparent from FIG. 2, the hinge panel 42 and hinge arm 56 define with door 24 and pillar structure 12 a quadrilateral linkage hinge arrangement which mounts the door for generally bodily translatory movement in known manner between the fully closed and fully opened positions thereof indicated respectively in solid and broken lines.

Referring to FIGS. 1, 3 and 4, there is mounted on outwardly facing portions of the body and hinge pillar 12 a pair of relatively stiff elastomeric snubber buttons or checks 64 and 66. The snubbers include threaded shanks receiving a pair of nuts which permit threading adjustment of the snubbers laterally of the plane of the door opening to various selected positions. The snubbers 64 and 66 are engageable with opposing faces of box section stiffeners 68 and 70 respectively, running longitudinally of the door 24. A similar vertically extending snubber button 72 adjacent the upper snubber 64 is engageable with the opposed face of a box section stiffener 74.

Snubbers 64 and 66, as mentioned, may be adjusted laterally of the door opening to various selected positions and particularly to a position wherein they will engage box sections 68 and 70 at some point in the door closing movement prior to its reaching the fully closed position thereof. In such an event, it is apparent that the door 24 must be forced against the reaction of the snubbers to the actual fully closed position thereof wherein the latch and latch striker at the rearward edge of the door will latchingly engage. Such forcing of the door to fully closed position necessarily entails stressing and elastic deformation of the structure of the door and also of the structure of hinge panel 42, hinge arm 56 and their connections to hinge pillar structure 12. Such stressing insures that the various hinge connections, and also the latch and latch striker, are relieved of all looseness of fit thereby to eliminate the possibility of rattling between these parts as might occur under severe road conditions.

It is believed apparent that the snubbing arrangement heretofore described is not necessarily limited in its benefits to the quadrilateral linkage type hinging herein specifically discussed, but that it may also be useful in simple single pivot hinges or otherwise. The snubbing arrangement of the invention is, however, particularly useful in quadrilateral linkage hinging due to the multiplicity of hinge connections therein.

With respect to the quadrilateral linkage hinge shown, it is apparent that the engagement of snubbers 64 and 66 with door 24 prior to its reaching fully closed position would have the door laterally displaced from the door opening generally throughout its length due to the generally translatory motion path that obtains with such hinging, and accordingly the subsequent stressing of the door to its fully closed position as hereinbefore described may not align all portions of the door with the adjacent body surfaces as desired. To avoid such a condition, turnbuckle 62 may be adjusted incident to the selected adjustment of the snubbers 64 and 66. For example, assume that the relationship of the various door and hinge parts shown in FIG. 2 represents an unstressed condition of the door wherein rattles may occur. Snubbers 64 and 66 are accordingly adjusted laterally outwardly from the positions shown to positions giving rise to engagement with the door at a selected partially open position. In such position, the marginal edge 28 would of necessity be displaced outwardly from the desired flush condition thereof with body outer panel 22 and would remain so displaced even when the rearward edge of the door is subsequently forced or stressed to fully closed position. To relieve this condition, the adjustment of snubbers 64 and 66 proceeds in increments with corresponding adjustment of the turnbuckle 62 in a manner to shorten hinge arm 56. Upon reflection, it will be seen that such shortening or rearrangement of the geometry of the quadrilateral hinging would, absent the snubbers 64 and 66, cause door 24 to be reoriented in a manner generally to displace the forward portion thereof inwardly and the rearward portion outwardly of the body opening from the orientation thereto shown in FIG. 2. Accordingly, it is seen that when swinging the door from open toward fully closed position its translatory path can be such as to engage the snubbers 64 and 66 precisely at the point wherein the marginal edge 28 thereof becomes aligned generally contiguous with outer body panel 22, yet with the remainder or rearward portions of the door remaining partially open or angularly related to the plane of the door opening such that the rearward edge of the door is displaced from fully closed position by some significant distance. It is this latter distance which may be adjusted for by appropriate selection of the positions of snubbers 64 and 66 and by the proper lengthening or shortening of hinge arm 56, whereby to provide for the desired degree of stress on door 24 when forcing it about the engaged snubbers from this partially open position to fully closed position. Accordingly, all rattling in the hinging is eliminated, yet all portions of the door are aligned in desired relation with adjacent body surfaces.

Having thus described the invention, what is claimed is:

1. In a vehicle body having an opening therein, hinge means on the body adjacent one edge of the opening, a closure structure including hinge means adjacent one edge portion thereof cooperable with the hinge means on the body to mount said closure structure on the body for swinging movement between fully closed and fully opened positions, snubber means on the body and on said closure structure engageable at a location adjacent said closure structure edge portion when the closure structure approaches fully closed position, and means for adjusting said snubber means to be engageable at a selected partially open position of the closure structure, said snubber means upon engagement in said partially open position of said closure structure providing substantial force reaction to closing forces applied to said closure structure adjacent the opposite edge portion thereof, said force reaction being sufficient under said closing forces to cause elastic deformation of said closure structure about said snubber means to a predetermined degree upon movement of the closure structure to the fully closed position thereof.

2. The combination recited in claim 1 wherein said hinge means on the body and said closure structure hinge means comprise quadrilateral hinge linkage.

3. The combination recited in claim 2 further including means for adjusting the length of at least one of the quadrilateral legs of said quadrilateral hinge linkage, said snubber means and said quadrilateral hinge linkage being adjustable to provide engagement between said snubber means at the desired partially open position of said closure structure yet locate said edge portion of said closure structure in proper closing relation to said opening when said snubber means is so engaged.

4. The combination recited in claim 1 wherein said snubber means includes a relatively stiff elastomeric stop member mounted on one of said closure structure or said body and engageable with an abutting surface on the other thereof.

5. The combination recited in claim 3 wherein said quadrilateral leg adjusting means includes turnbuckle means.

References Cited

UNITED STATES PATENTS

| | | | |
|---|---|---|---|
| 3,008,174 | 11/1961 | Schonitzer | 16—85 |
| 2,442,177 | 5/1948 | Riley et al. | |
| 3,163,452 | 9/1964 | Bryson et al. | |
| 3,187,372 | 6/1965 | Parsons | 16—82 |

BOBBY R. GAY, Primary Examiner

D. L. TROUTMAN, Assistant Examiner

U.S. Cl. X.R.

16—86